United States Patent [19]

Geraci

[11] Patent Number: 5,029,115

[45] Date of Patent: Jul. 2, 1991

[54] PROCESS FOR THE CREATION OF CAMERA-READY MECHANICALS

[75] Inventor: Joel F. Geraci, Brooklyn, N.Y.

[73] Assignee: Laserfast Industries, New York, N.Y.

[21] Appl. No.: 406,317

[22] Filed: Sep. 12, 1989

Related U.S. Application Data

[63] Continuation-in-part of Ser. No. 347,816, May 4, 1989, abandoned.

[51] Int. Cl.$^5$ .............................................. G06F 3/06
[52] U.S. Cl. ..................................... 364/523; 364/200
[58] Field of Search ............... 364/518, 521, 522, 523, 364/200, 300, 900

[56] References Cited

U.S. PATENT DOCUMENTS 4,094,000 6/1978 Brudevold .......................... 364/900
4,578,766 3/1986 Caddy ................................. 364/521

Primary Examiner—David L. Clark
Attorney, Agent, or Firm—James H. Callwood

[57] ABSTRACT

An electronic prepress process for the preparation of camera-ready mechanicals for color printing. The process facilitates the integration of both visual and textual and both black and white and color inputs from various sources into a final set of output files which can be read by Page Description software as a process step in the creation of camera-ready mechanicals for printing.

12 Claims, 8 Drawing Sheets

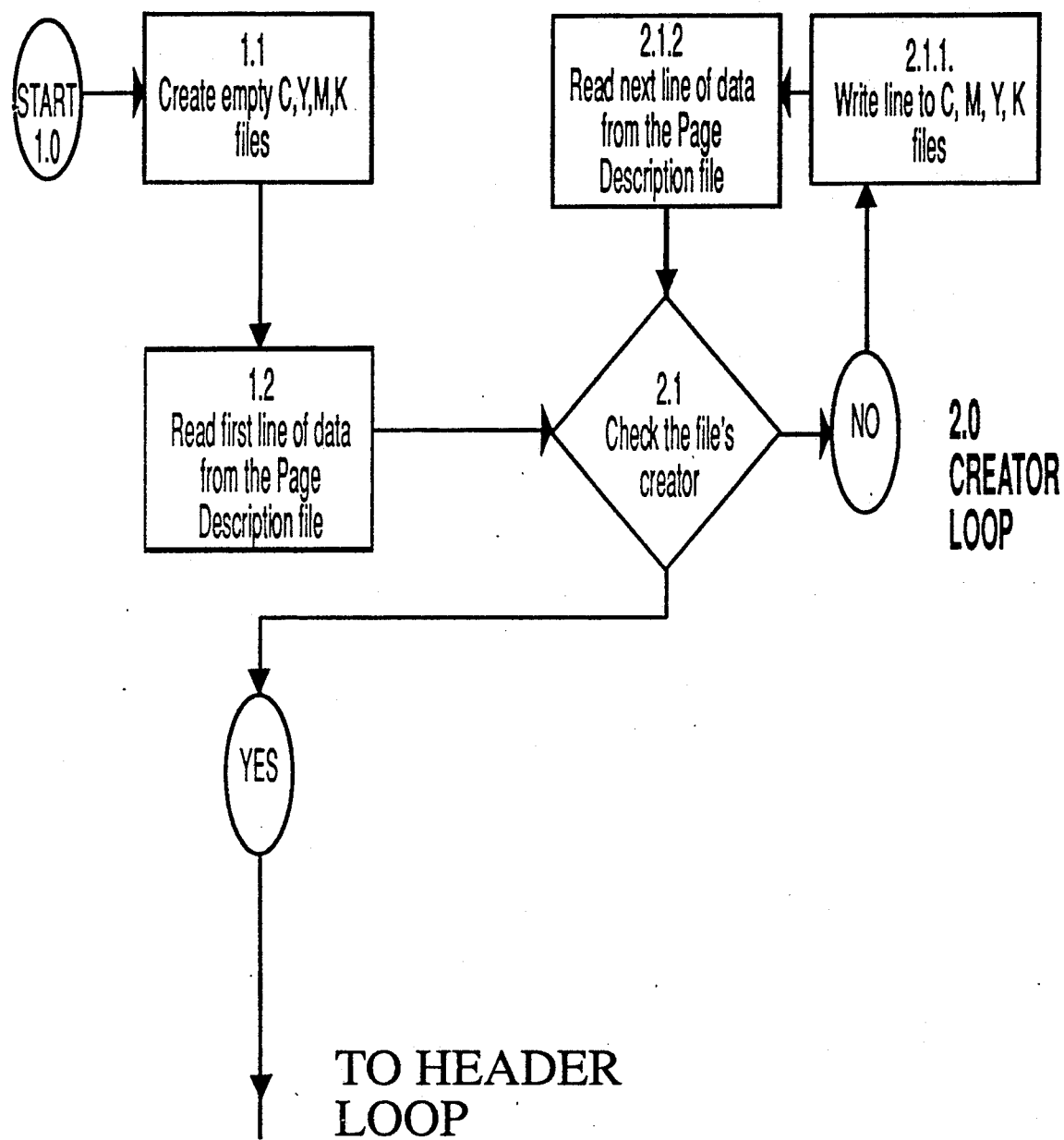
FIG. 1.1

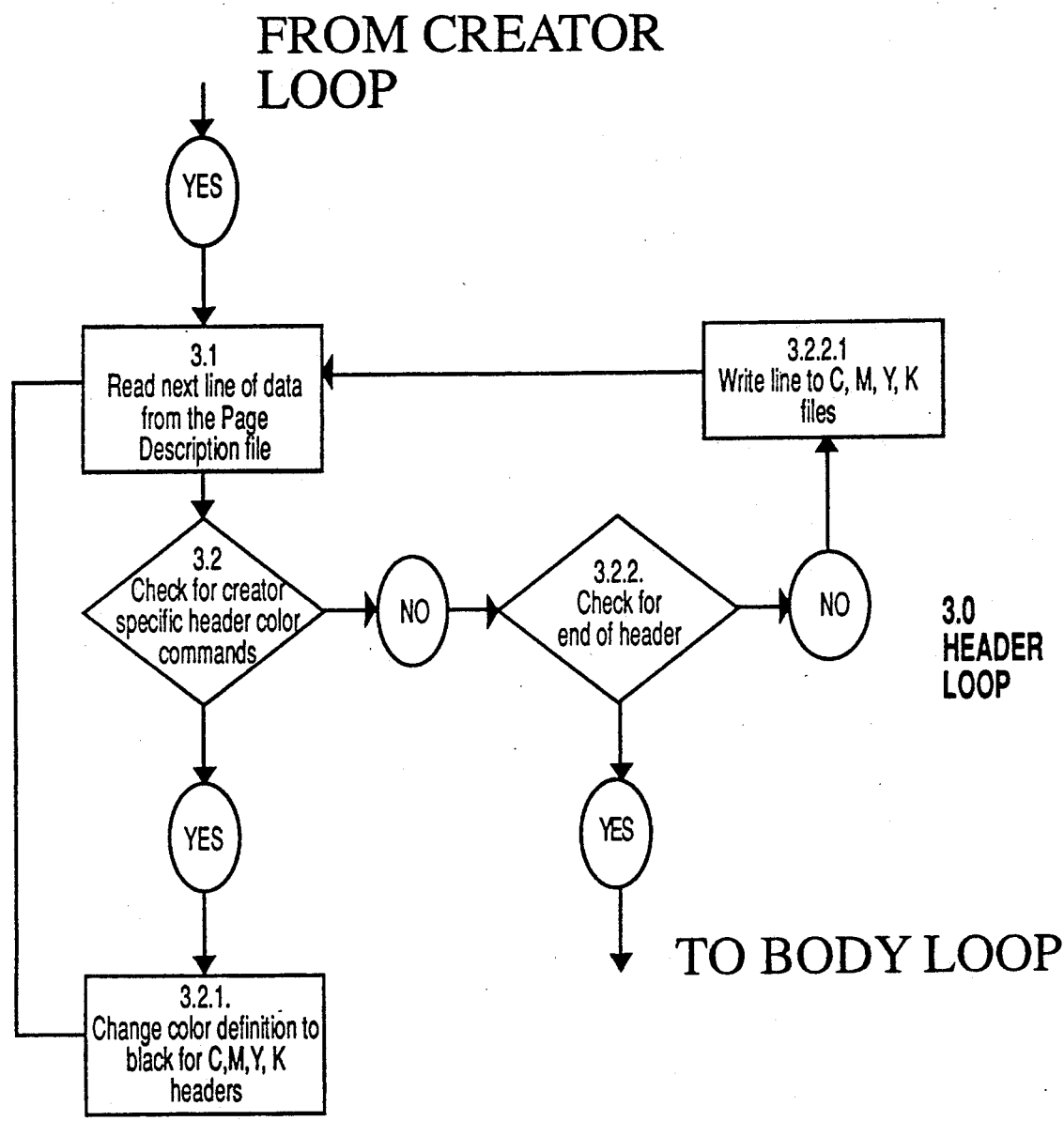
FIG. 1.2

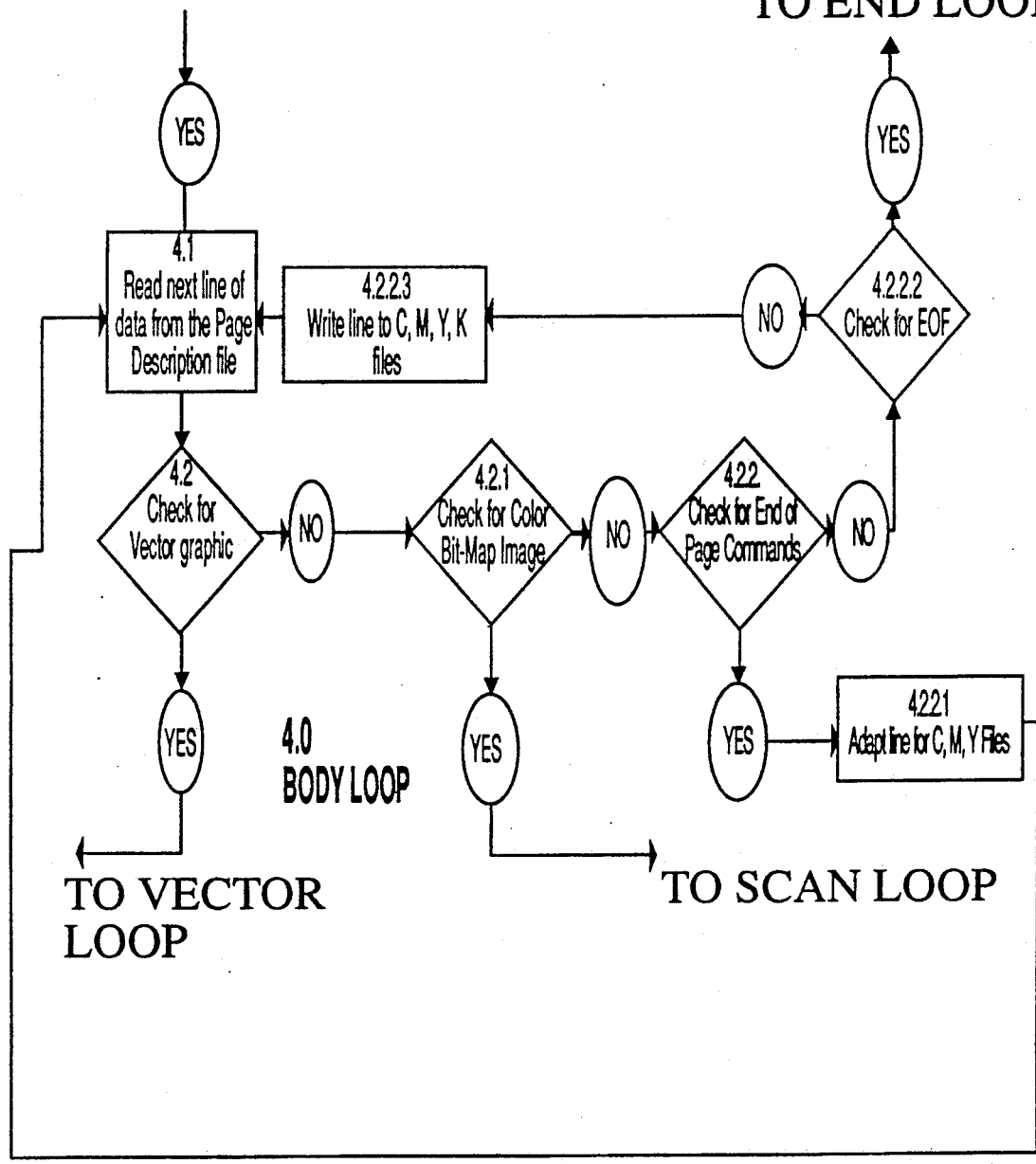
FIG. 1.3

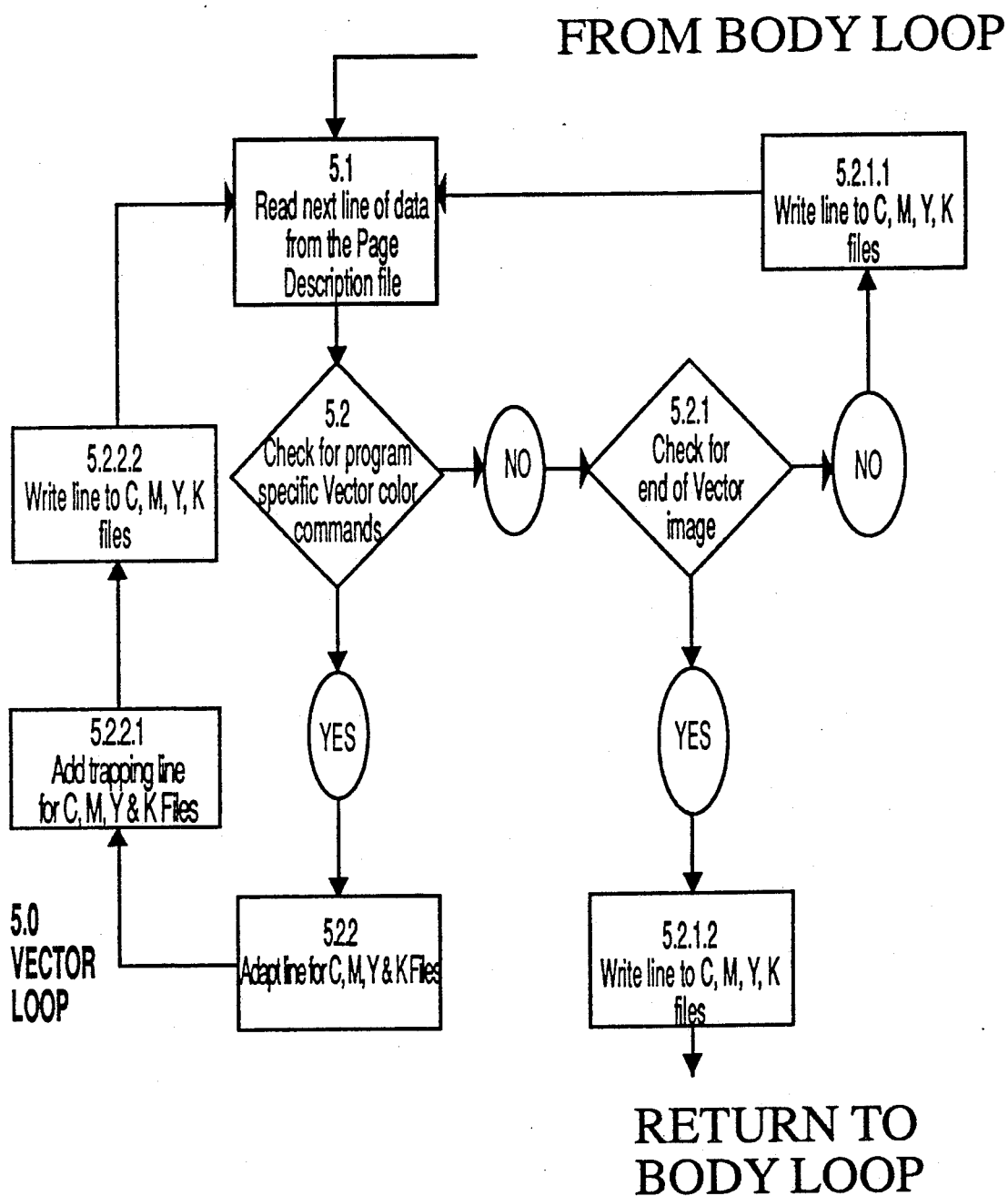
FIG. 1.4

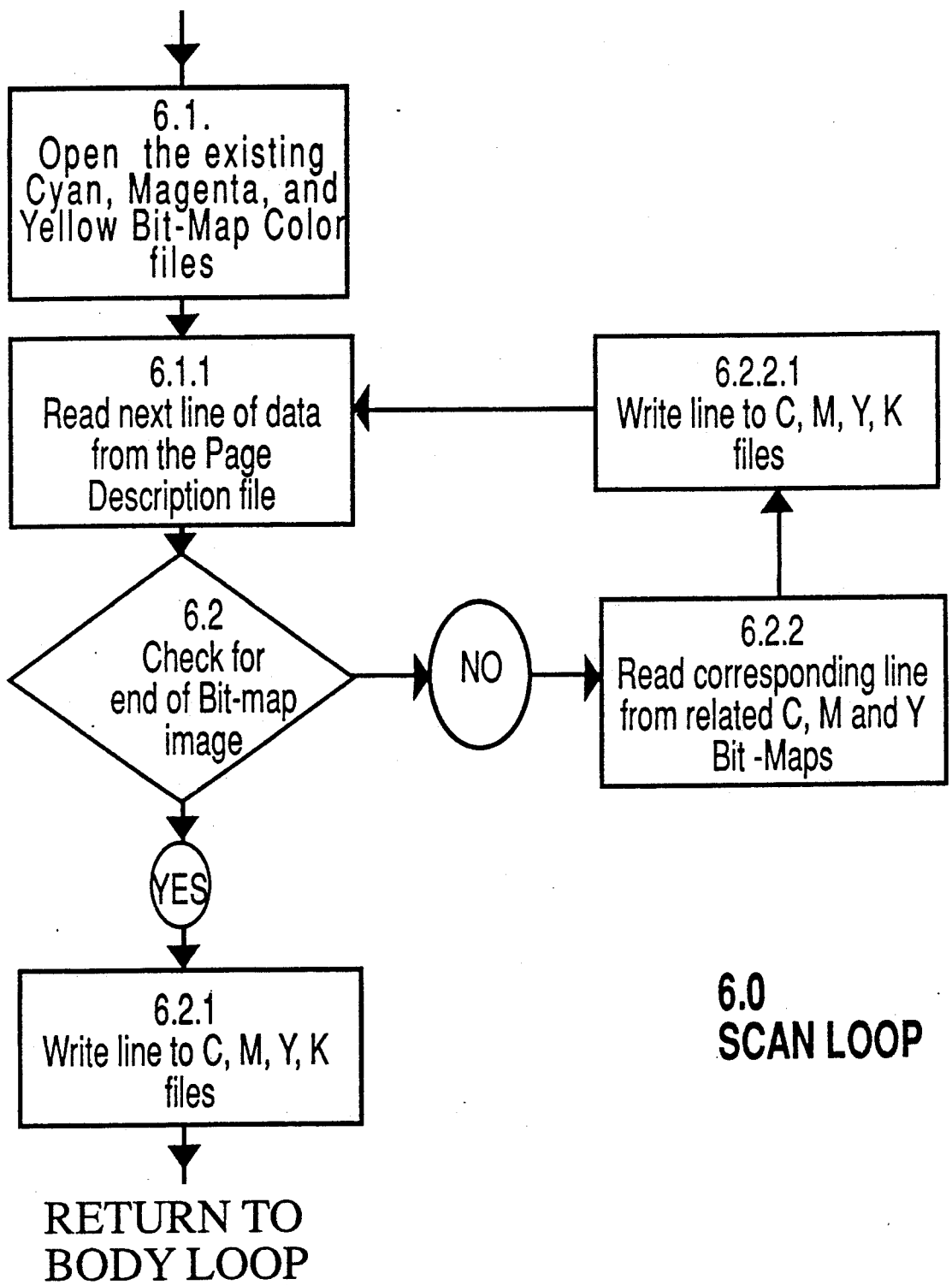
FIG. 1.5

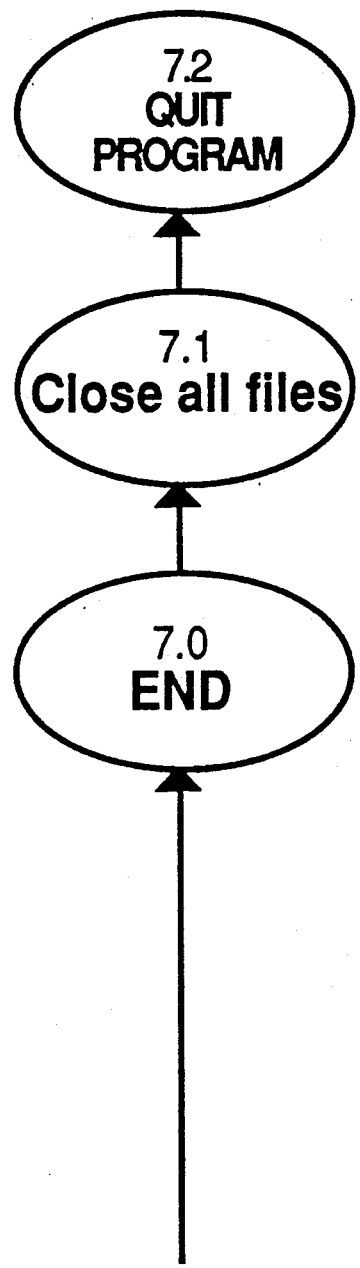
FIG. 1.6

PROCESS FOR THE CREATION OF CAMERA-READY MECHANICALS

This is a continuation-in-part of U.S. application Ser. No. 07/347,816 filed May 4, 1989 now abandoned.

An appendix "A" consisting of 7 pages of program listing for the Basic Language program in which the process of the invention is coded is included in this application.

BACKGROUND OF THE INVENTION

1. Field of the Invention

The present invention relates in general to an improved process for the preparation of camera-ready mechanicals for color printing. More particularly, the present invention relates to an improved electronic prepress process which facilitates the integration of both visual and textual and both black and white and color inputs from various sources into a final set of output files which can be read by a raster image processor as a process step in the creation of camera-ready mechanicals for printing.

2. Description of the Prior Art

The printing process is comprised of several discreet process steps which can be summarized as follows:

Prepress—the term which is used to describe all aspects of production up to preparation of the camera-ready mechanicals or film, prior to making the printing plate;

Platemaking—the process of converting a camera-ready mechanical or film into a printing plate;

Printing—the act of impressing the plate upon printing paper to reproduce the image on the plate or paper or other print medium;

The invention is directed to the prepress process step of print reproduction.

The color prepress process, i.e. all of the production activities leading up to preparation of the camera-ready mechanicals or film for color reproduction involves the following basic steps:
color separation;
color correction;
screening (halftones);
retouching;
image manipulation;
page assembly.

The use of electronic components has greatly facilitated the carrying out of the foregoing process steps.

An excellent description of the electronic color prepress process is presented in Publish! Magazine May 1989 at p. 44–49.

By laying down just three colors in correct proportions, it is possible to reproduce full-color images. The three colors used are yellow (y), magenta (m), and cyan (c). They are called subtractive primaries because each results from the subtraction of one of the additive primaries red, green, and blue that make up white light.

Full color art is "separated" into its red, green and blue components. Three separate photographic exposures are made using corresponding filters. The result is three separate negatives; i.e., black and white maps of where the red, green, and blue components of the picture lie. These are used to expose positive printing plates; one for cyan, one for yellow, and one for magenta. Cyan ink blocks (absorbs the wavelengths of) red light and transmits (reflects) blue and green. Yellow blocks blue and transmits red and green. Magenta blocks green and transmits blue and red. Basically color process printing involves laying down the corresponding subtractive primary ink in areas where the additive primary does not appear in the original. Therefore, for example, cyan should be printed in all areas where red does not appear in the original (which corresponds to the non-image area of the separation negative and the image area of the positive printing plate).

When all three colors are laid down in the proper areas, the result will appear to reproduce the original color range. In areas where only one subtractive ink prints, one additive primary will be blocked out and the other two will be reflected. Where two subtractive primaries print, all but one additive primary will be blocked out. For example, wherever cyan (blocks red) and magenta (blocks green) print, only blue will appear. Where all three subtractive primaries print, all three corresponding additive primaries will be blocked out, and the result will be black.

Because of imperfections in the physical nature of printing inks, not all colors are absorbed and transmitted as neatly as in theory. For this reason, colors will often appear muddy or contaminated with other hues. For example, reds usually appear orange and blacks appear greyish. The addition of a fourth print for black ink (k) is therefore necessary to enhance sharpness and color fidelity, and eliminate the problems associated with muddiness and color contamination.

The converse problem to muddiness and hue adulteration in the physical printing process is the problem of inexact registration when various colors and objects are juxtaposed with one another. Registration is defined as the placing of an object or hue next to another object or hue in such a manner that there is no break in the continuum of color and object. If the colors merely "bumped" into one another, a gap would occur when registration was not perfect, causing a result which is considered to be undesireable from a professional printing point of view. This problem is solved by a process called trapping wherein, in conventional prior art processes, the process colors (cmyk) of underlying shapes of a design are made to "bleed" into the colors of overlaying shapes.

The electronic prepress process which involves optically scanned images in combination with a page description language resulting in Bit-Mapped color image files as output eliminates many of the problems associated with inexact registration insofar as the negatives which are used to create the mechanicals for printing will all contain all four colors so that when one image is placed next to another image there will be continuity of color from one image to the next, thereby precluding the appearance of a gap between images.

The problem of inexact registration within the context of the electronic prepress process occurs when one image which does not contain the full color spectrum is juxtaposed with another image which does not contain the full color spectrum. In such situations, it is possible that insufficient overlap of images (i.e., inexact registration) will cause the appearance of a gap between images because of discontinuity in the color spectrum of the two images. This occurs when the images which are created in the prepress process emanate from various types of draw and graphics package software.

The starting point in the color prepress process is the capturing of the original image to be reproduced. This original image may emanate from different sources such as optically scanned input, or textual input via word processing at a "PC" or "MAC" workstation, or from various types of draw package software which may be utilized to create the image at an electronic work station.

These multiple inputs from different points of origination each have different functions, different features, different limitations, and different ways in which their input protocols are structured, and hence are to a significant extent incompatible. For example, draw packages were designed to function in a color environment while page layout software was originally designed for a black and white environment. Additionally, in situations wherein it is desired to overlay portions of one figure in an image with another figure of a different color, camera-ready mechanicals produced with electronic publishing systems having a central processing unit in the $6,000 price range, have here-to-fore produced printing plates wherein the fidelity of the color of the superimposed image was adulterated because of the partial transparency of printing inks which allowed the underlying color to show through the overlaid color. Additionally, the prior art processes, have required multiple sets of negatives which, when utilized in the "make ready" process, (i.e., the laying down and "stripping" of sets of negatives in preparation for the making of printing plates) have all required multiple preparations of sets of negatives for the combination of colors which it was desired to reproduce. For example, previously it has been necessary to produce at least two sets of four copies of C,M,Y,K negatives in electronic prepress processes which were directed to systems at the $6,000 central processor level.

In accordance with the present invention, a methodology is described for accomplishing electronic "bleeding" for the trapping process involving images derived from draw and graphics packages and integrating the input derived from various incompatible sources and manipulated by numerous types of incompatible software, into a final set of output files which can be read by a raster image processor output device, thereby eliminating the problems associated with multiple incompatible inputs into the electronic color prepress process disclosed in the prior art at the $6,000 central processing unit level.

SUMMARY OF THE INVENTION

The principal objects of the present invention are to provide a methodology for electronic trapping to enhance the registration process involving images which emanate from draw and/or graphics software, and to provide a methodology for the integration of electronic representations of images and text in black and white and color which are derived from multiple incompatible input sources, into a set of output files, which, when reproduced in the form of negatives and/or camera-ready mechanicals, can be used to produce printing plates which, when used in the printing process, maintain the color fidelity of the original images while also allowing for the overlaying and juxtaposition of a virtually unlimited number of graphical combinations to produce a final document which is in the exact desired form. This process is known in the electronic publishing art as electronic stripping.

The steps in the overall electronic prepress process which accomplish this result are summarized as follows:

A computer implemented method for creating a set of electronic parameters from which a raster image processor produces a set of black and white negative utilized to make printing plates which, when used in a printing process, reproduce a desired full color image, comprising:

(a) electronically capturing the images which make up the page description of the desired final output image using electronic capture means, and storing this electronic description in page description files which contain information regarding the color attributes which define each of the colors which is used in the electronic prepress process;

(b) Reading a line of data from one of the files mentioned in (a);

(c) checking each line of data mentioned in (b) for the presence of a color attribute which is encoded in a manner which is characteristic of the coding protocol of its electronic capture means, and when said color attribute is encountered;

(d) determining whether said color attribute mentioned in (c) pertains to Vector color images, and when said color attribute mentioned in (c) pertains to Vector color images;

(i) redefining said color attribute mentioned in (d) to its black representation by moving the value of said encountered attribute to the black position in the appropriate C,M,Y,K file, while setting the value of the originally encountered color attribute mentioned in (a) to —0—;

(ii) redefining the edges of an object to be trapped as indicated in (d) until the last line of data defining that object is encountered;

(iii) inserting commands to draw a thin line the size of the trap as indicated in (d) around the current path in the current color such that a slight overlap of color for all shapes is defined in the page description output file.

When page description software has defined a path, preferably having a width of 0.25 point, for a Vector Bit-Mapped object, any drawing or fill operations pertaining to that object, are performed on that path until a new path pertaining to a new object is established. By intercepting the fill commands in the page description output file, the line of data just before the new path (i.e.; new object) can be determined. The insertion of commands to draw a thin line the size of the trap required around the current path at this point effectively provides sufficient overlap (bleed) which fills any potential gap, thereby eliminating any spaces between objects.

Thus by the process of the present invention the multiple inputs from different points of origination, each of which has different functions, different features, different limitations, and different ways in which their input protocols are structured, and which are hence to a significant extent incompatible, are redefined in a manner which allows each of their functions to be fully utilized in creating a final desired output while provision is also made for the trapping (overlapping) of the edges of objects and colors to preclude the occurrence of gaps between objects and colors.

BRIEF DESCRIPTION OF THE DRAWINGS

FIG. 1.1 is an expanded representation of those portions of the process of the invention which pertain to the "Start" of the process and to the "Creator Loop".

FIG. 1.2 is an expanded representation of the portion of the process of the invention which pertains to the "Header Loop".

FIG. 1.3 is an expanded representation of the portion of the process of the invention which pertains to the "Body Loop".

FIG. 1.4 is an expanded representation of the portion of the process of the invention which pertains to the "Vector Loop".

FIG. 1.5 is an expanded representation of the portion of the process of the invention which pertains to the "Scan Loop".

FIG. 1.6 is an expanded representation of the portion of the process of the invention which pertains to the "End Loop".

DETAILED DESCRIPTION OF THE INVENTION

Figure 1:
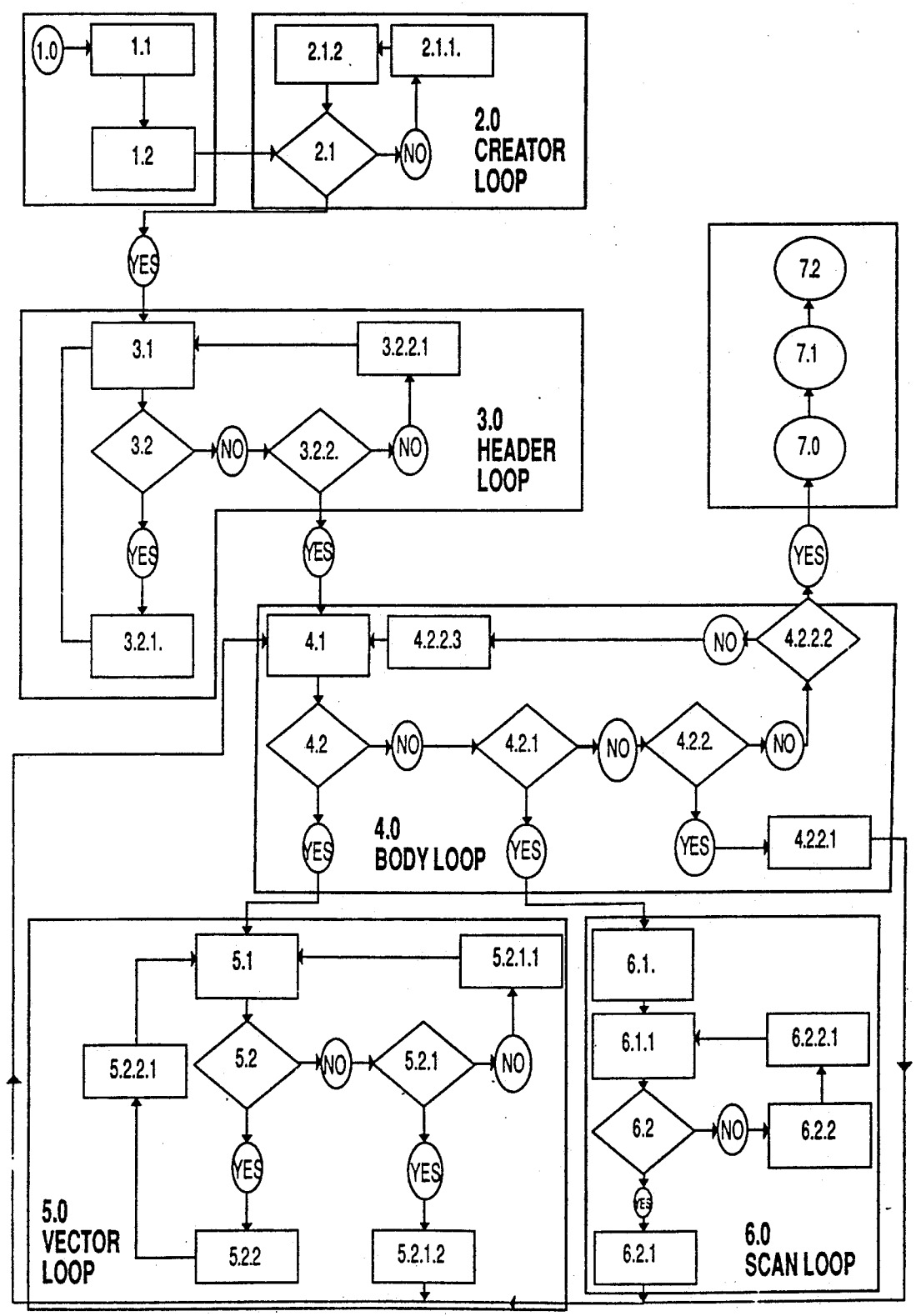
FIG. 1 is an overall flow chart of the process of the invention.

As used throughout the specification of the appended claims, the following terms shall be defined in the following manner:

Aldus PageMaker TM denotes the page make-up software of Aldus Corporation which performs the functions of capturing text, formatting text, creating graphic elements, and integrating type and graphics into page form;

Adobe Illustrator TM denotes the illustration software of Adobe Corporation which specializes in the creation of curves and high quality line art. Adobe Illustrator TM allows the user to input a scanned image, trace the image using special curves and lines, and add color and shading gradations;

Aldus FreeHand TM denotes the illustration software of Aldus Corporation which has similar functions to Abode Illustrator TM;

Encapsulated PostScript TM Files denotes files which save gray level information, halftone, screen information and screen image together in the same file which permits supporting graphics and electronic publishing programs to print the image on PostScript printers at full resolution and to save all of the information required by the system;

PostScript TM is the page description software of Adobe Corporation which creates text and graphic images from a common set of commands using outline fonts. For each document, the host computer sends programs to the raster image processor which compiles and runs it;

Raster Image Processor —RIP— denotes an output device which translates programs into the pattern of dots which fill the printed page. This includes graphic images with multiple levels of grey. The page description language translates the level of grey into the raster equivalent of a halftone. The raster image processor may be a standalone device or it may be comprised of electronic circuitry which is contained in an output device such as a laser printer or an image setter.

Image Setter denotes an output device which is capable of converting the output from a raster image processor into black and white negatives which can be utilized to make plates for use in the printing process which recreate the desired full color output image.

Pixel denotes individually addressable dots (picture elements) which, when aggregated together in a rectangular array, make up a printed or displayed image;

CMYK denotes cyan(c), magenta(m), yellow(y), and black(k) colors respectively;

Vector-oriented denotes a type of program wherein certain images such as arcs, circles, polygons and lines are placed on the computer screen by specifying coordinates which define the various images. These images are saved with their mathematical values allowing the entire object to be sized and rotated. Draw programs are exemplary of vector-oriented programs;

Pixel-oriented or bit-mapped programs denote ASCII format programs which save both "on" and "off" pixels; i.e., the whole screen is saved to memory. Exemplary of pixel-oriented programs are paint programs. In comparison, Vector-oriented programs, save the coordinates of only the begining and the ending points of the lines in addition to the mathematical formulas to arrive at the endpoint or the vectors in the drawings text.

Cyan, Magenta, Yellow and Black Files are files which hold the modified code to produce black representations of cyan, magenta yellow and black color definitions present in the Page Description output file;

Page Description Output File denotes a file created by a page composition program capable of printing to image setters which contain information describing all text and graphical elements on the page;

Creator denotes the generic designation of the program used to assemble the page. Exemplary of Creator programs are Aldus PageMaker TM, Quark XPress TM, Xerox Ventura TM, Publisher, Aldus FreeHand TM, and Adobe Illustrator TM. These designations are intended to be exemplary and are non-limiting. Creator programs are thus defined broadly enough to encompass any page composition program which is capable of creating Page Description output files;

Point denotes the width of a point of information which is a component of an image and is equal to 1/72 inch.

Write denotes the term commonly used to describe copying a segment of the computer program or data to the storage device;

Header denotes routines predefined in the beginning of the program by computer programs to condense otherwise lengthy procedures into shorthand notation. Headers function essentially in the manner of macro instructions;

Header color commands denotes PostScript TM routines defined by the page composition program to condense otherwise lengthy procedures pertaining to the color attributes of all elements on the page.

EPS Graphic Denotes the PostScript TM code generated by an object-oriented vector-based illustration program for use in page composition programs. Object-oriented refers to programs that define shapes in terms of a grid of variable size as opposed to picture elements on a defined screen. Compare this with vector-based which refers to programs which define objects in terms of their mathematical approximations as opposed to picture elements defined on a screen. Exemplary of EPS Graphic programs are Adobe Illustrator, and Aldus Freehand. These programs are merely exemplary and are non-limiting in their designation of EPS Graphic programs. It is understood that the definition of EPS Graphic is broad enough to encompass any illustration program which is capable of generating object-oriented PostScript TM code.

EPS Bit-mapped Color Images denotes a stream of data in PostScript ™ representing picture elements on a defined screen containing all information about color on a point by point basis as opposed to Vector-based as previously described. Generally, these files come from optical scanners. Exemplary of this type of image is PrePress Technology's SpectrePrint; ™

EPS-Color Commands denotes commands specific to the program which created them and describe the color attributes of the defined object. Exemplary of programs which may create EPS-Color Commands are Aldus FreeHand ™ And Adobe Illustrator;

End of EPS Graphic denotes the following commands: %%EndDocument;

Open denotes a term commonly used to describe preparing a sequential file to be read;

Bit-Mapped Color Files denotes files which are made up of the type of images described under "EPS Bit-mapped Color Images". The Black version (because it was the most representative of the four color files) was used by the page composition program in the process of the invention to determine position, size, and cropping and was incorporated into the PostScript ™ output file by the page composition program. This may be an image from PrePress Technology's SpectrePrint ™.

End of EPS Bit Map denotes the following commands: "RESTORE END";

As previously mentioned, the starting point in the color prepress process; i.e. the starting point in the process to which the invention is directed, is the capturing of the original image which is to be reproduced. This original image may emanate from a number of different sources. For example, the original image may be optically scanned, or it may be text which is entered at a word processing work station at a personal computer. Additionally, various software packages such as Ventura ™ PageMaker ™, Quark XPress ™, and Freehand ™ have been adapted for receiving the input from various sources and translating that input into machine readable form.

The particular mode of storage in machine readable form depends upon the source of the input. For example, draw programs are known as vector-oriented. Certain images—arcs, circles, polygons, lines,—are placed on the computer screen by specifying coordinates, and when these images are saved to disk, they are saved with their mathematical values. In this way, the entire object can be easily sized and rotated.

Paint programs are generally known as pixel-oriented, or bit-mapped packages. These programs save both "on" and "off" pixels; i.e., the whole screen is saved to memory. Draw programs, on the other hand, save the coordinates of only the beginning and ending points of the lines, or the vectors in the drawings. Text, on the other hand, is stored in ASCII format.

Paint and draw programs are specifically designed to handle color, while PageMaker ™, as originally designed was geared to handling only black and white text.

These programs for receiving and manipulating various types of input are jointly and collectively referred to as Page Description Software.

Figure 2:
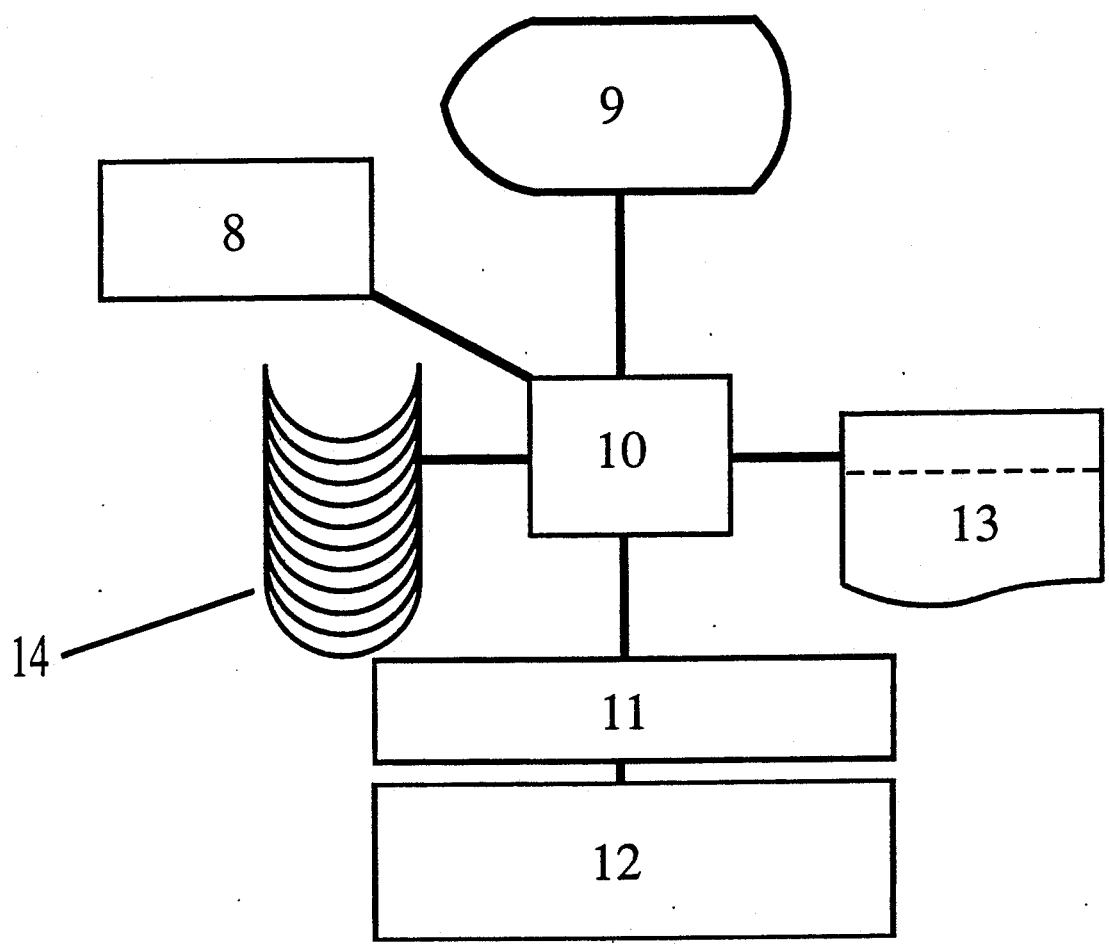
FIG. 2 is a schematic diagram of a hardware system configuration, including input, process, and output devices, and the software combination which can be utilized to run the process of the invention.

Referring now to FIG. 2, the schematic diagram illustrates an overall systems configuration of hardware input, process, and output devices and software which may be utilized to run the process of the invention.

In the process of the invention, all input/output devices, and software are "on-line", i.e., available to be utilized in the process of the invention whenever necessary. For example, once the system is initialized or "booted up", the optical scanner 8, the cathode ray tube 9, the MacIntosh (Mac, i.e., the personal computer hardware of Apple Computer Company) or PC (personal computer, i.e., the personal computer hardware of the IBM Corporation and IBM-compatible systems) central processor 10, the raster image processor (RIP) 11, the image setter 12, the laser printer 13, and the disk drives 14, are all available to perform their various functions. The page description software, i.e., software which can be organized into files which save all information created by page makeup software is resident on the disk drives and is available to be brought into main memory so that all software packages can be utilized in any desired combination to perform whatever functions are necessary to accomplish a given output result.

DESCRIPTION OF THE PREFERRED EMBODIMENTS

Referring now to FIG. 1.1, the process of the invention begins at the point designated as 1.0—Start. The first step is to create empty Cyan, Magenta, Yellow, and Black, files (hereinafter referred to as C,M,Y,K files respectively). These empty files are used to hold the modified code to produce black representations of the Cyan, Magenta, Yellow and Black definitions present in the Page Description output files.

The next step as indicated by 1.2 is to read the first line of data from the Page Description output file. The Page Description output file is created by a page—composition program capable of printing to an image setter which contains information describing all text and graphical elements on the page.

The next step as indicated by 2.1 takes place within the segment of the process called the Creator Loop. In this step, the process of the invention checks the line of data which was read in 1.2 for the presence of the Creator. The Creator is the program which is used to assemble the page. Exemplary of Creators are Aldus PageMaker ™, Quark Xpress ™, and Xerox Ventura ™ Publisher or other page composition programs which create Page Description files. If the line does not contain the Creator, the line is written unchanged to the C,M,Y,K files as indicated by 2.1.2. At this point, the next line of data are read from the Page Description output file and checked for the presence of the Creator. When the Creator is found in the line of data as indicated by 2.1.2, the process branches to the Header Loop segment of the process as indicated by 3 in FIG. 1.2—Header Loop. There is a Specific Header Loop for each specific page composition program.

Once the process branches to the Header Loop the next step as indicated by 3.1 is to read a line of data from the Page Description file. Next the process checks for the presence of Creator specific color commands as indicated by 3.2. If said Header specific color commands are present, the next step as indicated by 3.2.1 is to change color definition to black representation for C,M,Y, and K Headers.

Once the color definition has been changed, the next step is to write the line to the C,M,Y,K files as indicated by 3.2.1.1 and repeat the reading of subsequeant lines of data by branching back to the beginning of the Header Loop. The process continues to read subsequent lines of data until it encounters a line which indicates end of Header. The process branches to the Body Loop as indicated by 4.0 in FIG. 1.3.

The next step is indicated by 4.1 within the Body Loop segment of the process wherein the next line of data is read from the Page Description file. Next, the process checks for the presence of Vector graphic data as indicated by 4.2. If Vector graphic data is not found, the next step is 4.2.1 in which the process checks for the beginning of a Bit—Mapped Color Image. If a Bit—Mapped Color Image is not present, the process next checks for an end of page command as indicated in 4.2.2. If the end of page command is not found, the process next checks for end of file as indicated by 4.2.2.2. If the end of file is found the process then branches to the End Loop as indicated in 7.0 of FIG. 1.6. If the end of file is not found, the process writes a line to C,M,Y,K files as indicated in 4.2.2.3 and then branches to the beginning of the Body Loop to repeat the process.

When the process encounters a Color Bit-Mapped image, it branches to the Scan Loop 6.0 as indicated by FIG. 1.5. Alternatively, when the process encounters a line which contains Vector graphics data, it then branches to the Vector Loop 5.0 as indicated by FIG. 1.4.

When the process branches to the Vector Loop 5.0, the next step is to read a line of data from the Page Description software file as indicated in 5.1. The process next checks for the presence of program-specific (i.e. Creator-specific) Vector color commands as indicated in 5.2. If Vector color commands are not present, the process checks for the end of Vector graphic image as indicated in 5.2.1. If the end of Vector graphic image is not present, the process writes a line to C,M,Y,K files as indicated in 5.2.1.1 and then branches to the begining of the Vector Loop 5.1. If the line contains the end of Vector graphic, the process writes a line to C,M,Y,K files as indicated in 5.2.1.2 and branches to the Body Loop as indicated by 4.1.

If the line read in 5.2 does contain Vector color commands, the process changes color definition to black representation for C,M,Y,K files as indicated in 5.2.2. The next step is to add a trapping line for C,M,Y,K files as indicated in 5.2.2.1. The next step is to write a line to C,M,Y,K files as indicated in 5.2.2.2 after which the process then branches to the beginning of the Vector Loop 5.1.

The next step in the process occurs in the Scan Loop as indicated by 6.0. The process proceeds by opening the existing Cyan, Magenta, and Yellow Bit-Mapped Color files as indicated by 6.1. (The K file was imported into page composition software such as PageMaker TM prior to page composition by optical scanning software such as Pre-Press Technology's SpectrePrint TM). The process next reads the next line of data from page description files as indicated by 6.1.1. The process next checks for the presence of the end of the Bit-Map image. If the end of the Bit-Map image is present the process writes a line to C,M,Y,K files as indicated in 6.2.1 and returns to the Body Loop 4.1. If the end of the Bit-Map image is not present, the process reads the corresponding line of data from the Cyan Magenta, and Yellow Bit-Map Color files, along with the K line which was read in 6.1.1 (as indicated in 6.2.2). The process next writes the corresponding lines of the C,M,Y,K files which were opened at the start of the process and then branches to 6.1.1.

The final steps in the process are indicated by the End Loop 7.0 wherein the files are all closed as indicated in 7.1 and the process is Quit as indicated by 7.2.

APPENDIX A

```
CLS
PRINT "APC PUBLISHING CENTER"
PRINT "LaserMerge - COLOR INTEGRATION SOFTWARE"
LOCATE 5,1:PRINT "INPUT FILENAME: "
LOCATE 5,18
INPUT "",IN$
        OPEN IN$ FOR INPUT AS #1           'OPENS INPUT FILE
        PER = INSTR(IN$,".")               'FINDS THE EXTENTION
        NAME$ = LEFT$(IN$,PER-1)           'FINDS THE BASE NAME 'OPEN OUTPUT FILES TO BE PRINTED TO
        OPEN NAME$+".-C" FOR OUTPUT AS #2     'CYAN FILE
        OPEN NAME$+".-M" FOR OUTPUT AS #3     'MAGENTA FILE
        OPEN NAME$+".-Y" FOR OUTPUT AS #4     'YELLOW FILE
        OPEN NAME$+".-K" FOR OUTPUT AS #5     'BLACK FILENAME$+".-K" FOR OUTPU

'       BEGIN SEARCH FOR PAGEMAKER SETGRAYS ETC.

PAGEMAKER:
LINE INPUT #1,A$:GOSUB COMPLETE
        A = INSTR(A$,"AD_textcolor setgray")
        IF A > 0 THEN GOTO SETGRAY
        A = INSTR(A$,"sub setgray")
        IF A > 0 THEN GOTO SETGRAY
        A = INSTR(A$,"color setgray")
        IF A > 0 THEN GOTO SETGRAY
        A = INSTR(A$,"0.5 setgray")
        IF A > 0 THEN GOTO SETGRAY
        A = INSTR(A$,"1.0 setgray")
```

```
        IF A > 0 THEN GOTO SETGRAY
        A = INSTR(A$,"0.0 setgray")
        IF A > 0 THEN GOTO SETGRAY
        A = INSTR(A$,"def setgray")
        IF A > 0 THEN GOTO SETGRAY
        A = INSTR(A$,"PatternShade setgray")
        IF A > 0 THEN GOTO SETGRAY
        A = INSTR(A$,"setscreen setgray")
        IF A > 0 THEN GOTO SETGRAY
        A = INSTR(A$,"/Black 0 const")
        IF A > 0 THEN GOTO SETBLACK
        A = INSTR(A$,"%%Feature: InvertScreenProc")
        IF A > 0 THEN GOTO PMSCREEN
        A = INSTR(A$,"; document: ")
        IF A > 0 THEN GOTO DOCUMENT
        A = INSTR(A$,"%%EndSetup")
        IF A > 0 THEN
                GOSUB PRINTLINES
                GOTO EPS
        END IF
        GOSUB PRINTLINES
        GOTO PAGEMAKER PS:     'TEST FOR PRESENCE OF EPS IMAGES
        '
INE INPUT #1,A$:GOSUB COMPLETE
        '
        'FREEHAND TEST
        '
 = INSTR(A$,"%%Creator: FreeHand")
IF A > 0 THEN
        GOSUB PRINTLINES
        GOTO FREEHANDMAIN
END IF 'IMAGE TEST
        '
A = INSTR(A$,"Creator: SpectreCross")
IF A > 0 THEN GOSUB SPECTRE 'RESET BLACK AS A CONSTANT
A = INSTR(A$,"ENDPAGE")
IF A > 0 THEN
        PRINT #2,"/Black 1 const"
        PRINT #3,"/Black 1 const"
        PRINT #4,"/Black 1 const"
        GOSUB PRINTLINES
        A$ = ""
END IF 'CROPMARK & LABLE
V = INSTR(A$," - Black overlay) DV_DRAW_TEXT")
IF V > 0 THEN
        GOTO PAGENAME
END IF

GOSUB PRINTLINES
GOTO EPS

SETGRAY:
        PRINT #5,A$
        A = INSTR(A$,"setgray")
        A$=LEFT$(A$,A-1)+"pop 1 "+MID$(A$,A,LEN(A$)-A+1)
        PM = PM+1
        LOCATE 13,1:PRINT STR$(PM)+" PAGEMAKER HEADER LINES REPLACED"
        PRINT #2,A$
        PRINT #3,A$
        PRINT #4,A$
        GOTO PAGEMAKER
```

```
SETBLACK:
      PRINT #2,"/Black 1 const"
      PRINT #3,"/Black 1 const"
      PRINT #4,"/Black 1 const"
      PRINT #5,A$
      GOTO PAGEMAKER PMSCREEN:
      GOSUB PRINTLINES
      '       RESET THE SCREEN FREQUENCY AND ANGLES FOR THE SEPARATE COLORS
      C$="133.87 71.5651 {dup mul exch dup mul add 1 exch sub} setscreen"
      M$="133.87 18.4349 {dup mul exch dup mul add 1 exch sub} setscreen"
      Y$="141.111 0 {dup mul exch dup mul add 1 exch sub} setscreen"
      K$="149.671 45 {dup mul exch dup mul add 1 exch sub} setscreen"
      GOSUB PRINTCOLORS
      LINE INPUT #1,A$:GOSUB COMPLETE        'THROW AWAY NEXT TWO LINES OF DAT
      LINE INPUT #1,A$:GOSUB COMPLETE
      GOTO PAGEMAKER DOCUMENT:          '         RESET THE DOCUMENT NAME FOR EACH FILE
      DOC$=LEFT$(A$,LEN(A$)-1)
      PRINT #2,DOC$+"-Cyan)"
      PRINT #3,DOC$+"-Magenta)"
      PRINT #4,DOC$+"-Yellow)"
      PRINT #5,DOC$+"-Black)"
      GOTO PAGEMAKER

FREEHANDMAIN:

'MAIN SEQUENCE TEST FOR THE DIFFERENT FREEHAND SHAPES TO BE ANALYZED

LINE INPUT #1,A$:GOSUB COMPLETE

'     SET UP HEADER FOR TEXT TRAPPING
      IF LEFT$(A$,3) = "/ts" THEN
             GOSUB PRINTLINES

PRINT #2,"/stfs1{4 -2 roll 0 ne{0 ne/textopf xdf 5 index 5 index
             PRINT #2,"0 ne{0 ne/textopf xdf sto1}{pop pop pop pop}ifelse fal PRINT #3,"/stfs1{4 -2 roll 0 ne{0 ne/textopf xdf 5 index 5 index
             PRINT #3,"0 ne{0 ne/textopf xdf sto1}{pop pop pop pop}ifelse fal PRINT #4,"/stfs1{4 -2 roll 0 ne{0 ne/textopf xdf 5 index 5 index
             PRINT #4,"0 ne{0 ne/textopf xdf sto1}{pop pop pop pop}ifelse fal PRINT #5,"/stfs1{4 -2 roll 0 ne{0 ne/textopf xdf 5 index 5 index
             PRINT #5,"0 ne{0 ne/textopf xdf sto1}{pop pop pop pop}ifelse fal

A$=""
      END IF

'       FILLED SHAPES
      A = INSTR(A$,"]setcolor  {fill}fp")
      IF A > 0 THEN GOSUB FREEFILL

'       PLAIN TEXT

IF RIGHT$(A$,2) = "ts" THEN FTX = 1
      IF LEFT$(A$,1) = "[" AND RIGHT$(A$,1) = "]" AND FTX = 1 THEN GOSUB FREET

'FREEHAND TEST 4
      V = INSTR(A$,"] rectfill")
      IF V > 0 THEN GOSUB FREEHAND4

'       END OF FREEHAND DOCUMENT
      A = INSTR(A$,"%%EndDocument: _")
      IF A > 0 THEN GOTO EPS
      GOSUB PRINTLINES
```

```
GOTO FREEHANDMAIN

FREEFILL:
        "GET THE COLORS
        GOSUB FREEPARSE
        C$="[0 0 0 "+STR$(C)+"]setcolor    (fill)fp"
        M$="[0 0 0 "+STR$(M)+"]setcolor    (fill)fp"
        Y$="[0 0 0 "+STR$(Y)+"]setcolor    (fill)fp"
        K$="[0 0 0 "+STR$(K)+"]setcolor    (fill)fp"
        GOSUB PRINTCOLORS
        '
        '       TRAP THE FILL FOR EACH COLOR GRATER THAN 0
        IF C > 0 THEN
                PRINT #2,"grestore"
                PRINT #2,"gsave"
                PRINT #2,"0.4 setlinewidth 0 setlinecap 0 setlinejoin 3.863693 s
        END IF
        IF M > 0 THEN
                PRINT #3,"grestore"
                PRINT #3,"gsave"
                PRINT #3,"0.4 setlinewidth 0 setlinecap 0 setlinejoin 3.863693 s
        END IF
        IF Y > 0 THEN
                PRINT #4,"grestore"
                PRINT #4,"gsave"
                PRINT #4,"0.4 setlinewidth 0 setlinecap 0 setlinejoin 3.863693 s
        END IF
        IF K > 0 THEN
                PRINT #5,"grestore"
                PRINT #5,"gsave"
                PRINT #5,"0.4 setlinewidth 0 setlinecap 0 setlinejoin 3.863693 s
        END IF
        A$=""
        RETURN FREETEXT:
        '       RESET TEXT COLORS
        GOSUB FREEPARSE
        C$="[0 0 0 "+STR$(C)+"]"
        M$="[0 0 0 "+STR$(M)+"]"
        Y$="[0 0 0 "+STR$(Y)+"]"
        K$="[0 0 0 "+STR$(K)+"]"
        GOSUB PRINTCOLORS
        IF C > 0 THEN
                C$ = C$+" .4 0 1 0 1 stfs1"
                PRINT #2,C$
        ELSE
                PRINT #2,"sts"
        END IF IF M > 0 THEN
                M$ = M$+" .4 0 1 0 1 stfs1"
                PRINT #3,M$
        ELSE
                PRINT #3,"sts"
        END IF IF Y > 0 THEN
                Y$ = Y$+" .4 0 1 0 1 stfs1"
                PRINT #4,Y$
        ELSE
                PRINT #4,"sts"
        END IF IF K > 0 THEN
                K$ = K$+" .4 0 1 0 1 stfs1"
                PRINT #5,K$
        ELSE
                PRINT #5,"sts"
        END IF
```

```
                'GET RID OF STS
          LINE INPUT #1,A$
          A$=""
          FTX = 0
          RETURN

FREEPARSE:
          B1=INSTR(A$,"[")
          B2=INSTR(B1+1,A$," ")
          B3=INSTR(B2+1,A$," ")
          B4=INSTR(B3+1,A$," ")
          B5=INSTR(B4+1,A$,"]")
          C=VAL(MID$(A$,(B1+1),(B2-B1-1)))
          M=VAL(MID$(A$,(B2+1),(B3-B2-1)))
          Y=VAL(MID$(A$,(B3+1),(B4-B3-1)))
          K=VAL(MID$(A$,(B4+1),(B5-B4-1)))
          RETURN

FREEHAND4:
          B1=INSTR(A$,"[")
          B2=INSTR(B1+1,A$," ")
          B3=INSTR(B2+1,A$," ")
          B4=INSTR(B3+1,A$," ")
          B5=INSTR(B4+1,A$,"]")
          C1=VAL(MID$(A$,(B1+1),(B2-B1-1)))
          M1=VAL(MID$(A$,(B2+1),(B3-B2-1)))
          Y1=VAL(MID$(A$,(B3+1),(B4-B3-1)))
          K1=VAL(MID$(A$,(B4+1),(B5-B4-1)))
          E1=INSTR(B5+1,A$,"[")
          E2=INSTR(E1+1,A$," ")
          E3=INSTR(E2+1,A$," ")
          E4=INSTR(E3+1,A$," ")
          E5=INSTR(E4+1,A$,"]")
          C2=VAL(MID$(A$,(E1+1),(E2-E1-1)))
          M2=VAL(MID$(A$,(E2+1),(E3-E2-1)))
          Y2=VAL(MID$(A$,(E3+1),(E4-E3-1)))
          K2=VAL(MID$(A$,(E4+1),(E5-E4-1)))
          BASE$=LEFT$(A$,B1)
          C$=BASE$+"0 0 0 "+STR$(C1)+"] [0 0 0 "+STR$(C2)+"] rectfill"
          M$=BASE$+"0 0 0 "+STR$(M1)+"] [0 0 0 "+STR$(M2)+"] rectfill"
          Y$=BASE$+"0 0 0 "+STR$(Y1)+"] [0 0 0 "+STR$(Y2)+"] rectfill"
          K$=BASE$+"0 0 0 "+STR$(K1)+"] [0 0 0 "+STR$(K2)+"] rectfill"
          F=F+1
          LOCATE 14,1
          PRINT STR$(F)+" FREEHAND OBJECTS REPLACED
                    PRINT #2,C$
                    PRINT #3,M$
                    PRINT #4,Y$
                    PRINT #5,K$
                    A$=""
          RETURN SPECTRE:
          'GET NAME OF FILE TO OPEN BY CLEARING THE FIRST 5 LINES
          FOR I = 1 TO 5
                    LINE INPUT #1,A$
          NEXT
          'GETTING NAME
          LINE INPUT #1,A$
                    S1 = INSTR(A$," ")
                    CYA$=RIGHT$(A$,LEN(A$)-S1)
          LINE INPUT #1,A$
                    S1 = INSTR(A$," ")
                    MAG$=RIGHT$(A$,LEN(A$)-S1)
          LINE INPUT #1,A$
                    S1 = INSTR(A$," ")
                    YEL$=RIGHT$(A$,LEN(A$)-S1)
          LINE INPUT #1,A$
                    S1 = INSTR(A$," ")
                    BLA$=RIGHT$(A$,LEN(A$)-S1)
```

```
'OPEN THE FILES
locate 1,30:print left$(cya$,len(cya$)-5)+" Image
OPEN CYA$ FOR INPUT AS #6
OPEN MAG$ FOR INPUT AS #7
OPEN YEL$ FOR INPUT AS #8
OPEN BLA$ FOR INPUT AS #9
'CLEAR LAST LINE OF GHOST FILE
LINE INPUT #1,A$
'CLEAR FIRST LINE OF EPS FILES
LINE INPUT #6,A$
LINE INPUT #7,A$
LINE INPUT #8,A$
LINE INPUT #9,A$
'COPY FIRSY 9 LINES OF IMAGE FILES TO OUTPUT FILES
FOR I = 1 TO 9
        LINE INPUT #6,C$
        LINE INPUT #7,M$
        LINE INPUT #8,Y$
        LINE INPUT #9,K$
        GOSUB PRINTCOLORS
NEXT
' ADD SCREEN INFORMATION LINE TO OUTPUT FILES
C$ = "133.87 71.5651 {dup mul exch dup mul add 1 exch sub} setscreen"
M$ = "133.87 18.4349 {dup mul exch dup mul add 1 exch sub} setscreen"
Y$ = "141.111 0 {dup mul exch dup mul add 1 exch sub} setscreen"
K$ = "149.671 45 {dup mul exch dup mul add 1 exch sub} setscreen"
GOSUB PRINTCOLORS
' CLEAR SCREEN INFORMATION FROM INPUT FILES
LINE INPUT #6,A$
LINE INPUT #7,A$
LINE INPUT #8,A$
LINE INPUT #9,A$
WHILE NOT EOF(6)
        LINE INPUT #6,C$
        LINE INPUT #7,M$
        LINE INPUT #8,Y$
        LINE INPUT #9,K$
        IL1=IL1+1
        LOCATE 1,45:PRINT IL1
        GOSUB PRINTCOLORS
WEND
IL1=0
A$=""
CLOSE #6
CLOSE #7
CLOSE #8
CLOSE #9
RETURN PAGENAME:
        A = INSTR(A$,"Black")
        PRINT #5,A$
        C$=LEFT$(A$,A-1)+"                              Cyan "+DATE$+"   "+TIME$+
        M$=LEFT$(A$,A-1)+"
        Y$=LEFT$(A$,A-1)+"
        PRINT #2,C$
        PRINT #3,M$
        PRINT #4,Y$
        GOTO EPS COMPLETE:                               'DISPLAYS % COMPLETE
COMP=COMP+LEN(A$)+2
LOCATE 9,1
PRINT STR$(INT(COMP/LOF(1)*100))+"% through "+IN$
RETURN
```

```
PRINTLINES:
            PRINT #2,A$
            PRINT #3,A$
            PRINT #4,A$
            PRINT #5,A$
RETURN

PRINTCOLORS:
            PRINT #2,C$
            PRINT #3,M$
            PRINT #4,Y$
            PRINT #5,K$
RETURN
```

What is claimed is:

1. A computer implemented method for creating a set of electronic parameters from which a raster image processor produces a set of black and white negatives utilized to make printing plates which, when used in a printing process, reproduce a desired full color image, comprising:

(a) electronically capturing the images which make up the page description of the desired final output image using electronic capture means, and storing this electronic description in page description files which contain information regarding the color attributes which define each of the colors which is used in the electronic prepress process;

(b) reading a line of data from one of the files mentioned in (a);

(c) checking each line of data mentioned in (b) for the presence of a color attribute which is encoded in a manner which is characteristic of the coding protocol of its electronic capture means, and when said color attribute is encountered;

(d) determining whether said color attribute mentioned in (c) pertains to Vector color images, and when said color attribute mentioned in (c) pertains to Vector color images;

(i) redefining said color attribute mentioned in (d) to its black representation by moving the value of said encountered attribute to the black position in the appropriate C,M,Y,K file, while setting the value of the originally encountered color attribute mentioned in (a) to —O—;

(ii) redefining the edges of an object to be trapped as indicated in (d) until the last line of data defining that object is encountered;

(iii) inserting commands to draw a thin line the size of the trap indicated in (d) around the current path in the the current color such that a slight overlap of color for all shapes is defined in the page description output file.

2. The process according to claim 1 wherein said electronic capture means is a Creator.

3. The process according to claim 2 wherein said Creator comprises Aldus PageMaker TM, Xerox Ventura TM Publisher, Aldus FreeHand TM, Adobe Illustrator TM, and Quark XPress TM.

4. The process according to claim 3 wherein said Creator is Quark XPress TM.

5. The process according to claim 3 wherein said Creator is Aldus FreeHand TM.

6. The process according to claim 3 wherein said Creator is Aldus PageMaker TM.

7. The process according to claim 3 wherein said Creator is Adobe Illustrator TM.

8. The process according to claim 3 wherein said Creator is Xerox Ventura TM Publisher.

9. The process according to claim 1 wherein said electronic capture means is comprised of optical scanning software which produces Bit—Mapped Color Images.

10. The process according to claim 9 wherein said software which produces Bit-Mapped color Images is PrePress Technology's SpectrePrint TM.

11. The process according to claim 1 wherein said raster image processor is a PostScript TM - supported raster image processor.

12. The process according to claim 1 wherein said thin line has a width of 0.25 Point.

* * * * *